April 14, 1925.
H. F. MARANVILLE
MANDREL
Filed Dec. 11, 1919    2 Sheets-Sheet 1
1,533,604
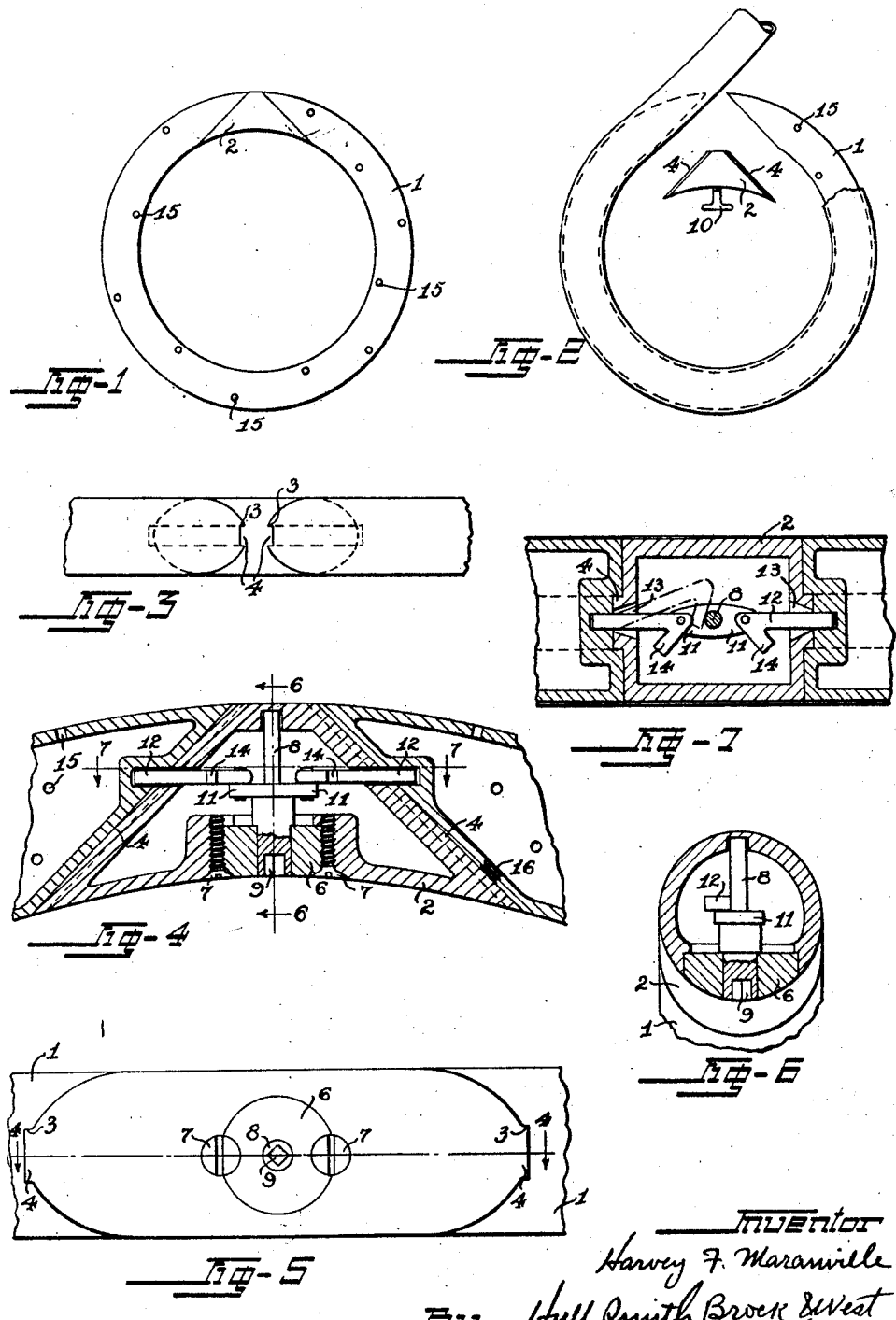
Inventor
Harvey F. Maranville
By Hull, Smith, Brock, & West
Attys April 14, 1925.

H. F. MARANVILLE

MANDREL

Filed Dec. 11, 1919     2 Sheets-Sheet 2

Inventor
Harvey F. Maranville
By Hull Smith Brock & West
Attys

Patented Apr. 14, 1925.

1,533,604

UNITED STATES PATENT OFFICE.

HARVEY F. MARANVILLE, OF AKRON, OHIO, ASSIGNOR, BY MESNE ASSIGNMENTS, TO THE FIRESTONE TIRE AND RUBBER COMPANY, OF AKRON, OHIO, A CORPORATION OF OHIO.

MANDREL.

Application filed December 11, 1919. Serial No. 344,131.

*To all whom it may concern:*

Be it known that I, HARVEY F. MARANVILLE, a citizen of the United States, residing at Akron, in the county of Summit and State of Ohio, have invented a certain new and useful Improvement in Mandrels, of which the following is a full, clear, and exact description, reference being had to the accompanying drawings.

This invention relates to mandrels for use in making pneumatic tubes and other adjuncts of pneumatic tires by which I especially mean inner tubes and air bags. These tubular rubber members are first molded, and sometimes cured also, upon a circular metal ring and then removed and their ends suitably joined together. The objects of the present invention are the provision of a mandrel for this purpose having peculiar provisions for facilitating the removal of the formed article; the provision of a mandrel having a removable portion of peculiar shape adapted to facilitate the removal of such article, and provided with convenient and efficient means for holding it in place; the provision of a segmental type of mandrel of peculiar and effective form; while further objects and advantages of the invention will become apparent as this description proceeds.

Figure 8:
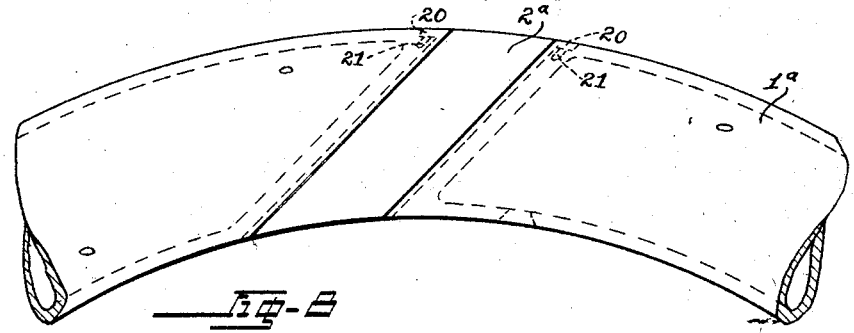
Figure 9:
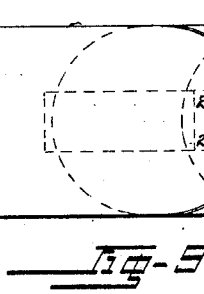
Figure 10:
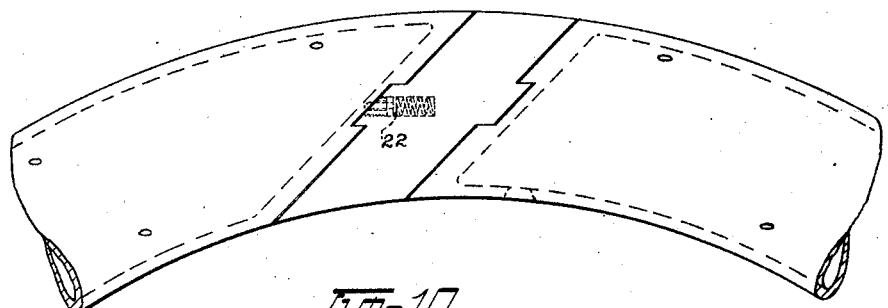
Figure 11:
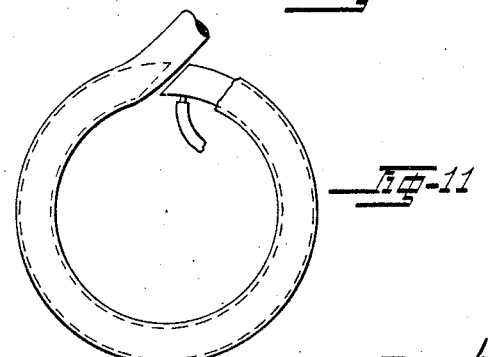

In the drawings accompanying and forming a part of this application, I have illustrated certain embodiments of my said invention although it will be understood that I am not restricted to the details of construction and arrangement shown therein except as the same are recited in my claims, since my inventive idea can appear in numerous physical forms. In these drawings, Fig. 1 is a side view of a complete mandrel embodying my improvements; Fig. 2 illustrates the step of removing a tube from the same; Fig. 3 is an edge view of a part of the mandrel shown in Fig. 1 illustrating the removable segment; Fig. 4 is a longitudinal sectional view through the removable segment drawn to enlarged scale and corresponding to the line 4—4 of Fig. 5; Fig. 5 is a bottom plan view of the segment shown in Fig. 4; Figs. 6 and 7 are sectional views corresponding to the similarly numbered lines in Fig. 4; Fig. 8 is a side view of part of a mandrel showing a modified form of my invention; Fig. 9 is a top view of the parts shown in Fig. 8; Fig. 10 illustrates yet another embodiment of my said invention; and Fig. 11 illustrates the step of removing the finished tube.

Describing the parts by reference characters, my improved mandrel consists of a torus shaped body 1, subtending nearly a complete circle and having a removable section 2. The adjacent ends of the body 1 are cut upon planes parallel to the axis of the torus but oblique to the radius thereof, said planes, in Figs. 1 and 2, diverging inwardly and being spaced apart a short distance at the outermost edge of the device. Each of the end faces is formed with a groove 3 parallel to the plane of the torus, and the ends of the removable section are formed with tongues 4—4 which fit in said grooves.

Any one of many expedients can be employed for securing this removable section in place, the construction shown in Figs. 1 to 6 comprising one or more protrudable catches mounted in the removable section and adapted when extended to engage suitable sockets formed in the ends of the body, these catches being operated by means of a removable key. In the present embodiment, I have shown the removable section as hollow and having at its inner side a removable plate 6 held in place by screws 7—7. Rotatably mounted in this plate is a shaft 8 having at its outer end a socket 9 adapted for the reception of the key 10 and formed inside the removable section with projecting ears 11—11 to which are pivoted the catches 12—12 whose outer ends are received in apertures 13—13 formed in the slanting walls of the device. The length of these catches is such as to cause them to protrude and engage the adjacent member as shown in Fig. 4, when the shaft is turned in one direction or to be retracted as shown in dotted lines in Fig. 7 when the shaft is turned to one side. The holes 13 are made flaring to permit the necessary locking of the catches, and I have shown the catches as provided with offset ends 14 adapted to engage the shaft 8 and prevent the latter from being turned so far as to remove the catches entirely from those holes.

In the embodiment illustrated in Figs. 8 to 11 inclusive, the two sides of the removable section are substantially parallel to each other but oblique to the radius of the torus at that point. In Figs. 8 and 9 the abutting surfaces are formed with tongues and grooves which are parallel to the plane of the torus, the removable section 2ª having ears 20, 20 which drop into sockets in the surface of the body 1ª and constitute stops to keep it from going too far. Pins or screws 21 may be carried by these ears to hold the section against accidental dropping out. In Fig. 10 the tongues and grooves run transversely of the torus and friction alone may be relied upon to hold it in place, especially if the removable section is made slightly overwide so as to utilize the elasticity of the main body or supplemented by a suitable lock such as the impositive, spring pressed pin 22.

In use the removable section is first applied and fastened in an obvious manner, after which the tubular article is built around the mandrel in the customary way. The cross section of the removable section being identical with that of the rest of the device, this can readily be done by mechanical means. After the article is completed, together with such curing, if any, which is desired to be performed upon the mandrel, the article is cut away adjacent to the removable section, and the latter removed, thereby opening a gap through which the tube can easily be withdrawn as shown in Figs. 2 and 11. In order to facilitate the removal of this tube, the walls of the body 1 are formed with a considerable number of small perforations 15 for the escape of compressed air which serves to inflate the tube to a degree and free it from the mandrel. This compressed air is introduced into the mandrel by means of a suitable aperture 16 located adjacent to one of the ends, the ends being otherwise closed so as to prevent the escape of air at this point. The inclined formation of the ends of the body cooperates with the shape of that body to facilitate the removal of the tube without obstruction or interference by the opposite end of the body. By this expedient I am able to bring the ends of the main body more nearly together than ever before, in fact to a distance limited only by the thickness of the tube itself.

Having thus described my invention what I claim is:

1. A two-piece mandrel for inner tubes comprising a substantially torus-shaped body and a single removable segment, said body subtending nearly a complete circle, and having its ends formed upon planes which are inclined relatively to the radius of the torus at that point, and said removable segment having its ends complementary to the ends of said body and also conforming in longitudinal curvature and transverse section to said body.

2. A two-piece mandrel for inner tubes comprising a substantially torus-shaped body and a single removable segment, said body subtending nearly a complete circle and having at least one of its ends terminated in a plane which is oblique to the radius at that point, and said segment being detachably secured between the ends of said body, the cross section of said body and segment being substantially circular.

3. A two-piece mandrel for pneumatic tubes comprising a substantially torus-shaped body comprising nearly a complete circle, the ends of the body being separated by a distance not greater than the thickness of the body and not less than the thickness of the tube which is to be formed thereon.

4. In a mandrel, the combination with a substantially torus-shaped body made in one piece and subtending nearly but not quite a complete circle and having inclined ends spaced apart to provide a gap much wider at the inner circumference of the mandrel than at the outer, of a removable section adapted to fit in said gap and to complete the contour of said mandrel, and a longitudinally protrudable latch carried by said removable segment, the end of the body having a recess adapted to receive said latch.

5. A mandrel for use in making inner tubes comprising, a single piece torus-shaped body portion having inclined end faces converging toward the peripheral line of the torus to form a wedge-shaped gap of slightly greater width at the peripheral line of the torus than the thickness of the tube, a removable section adapted to fit snugly between the ends of the torus to bridge the gap, and means for locking the section in position between said end faces.

6. A two-piece, torus-shaped mandrel, the pieces being terminated by planes which make an oblique angle to the radius of the torus and the planes which converge together outwardly and meet at a point outside of the torus distant from the torus less than the radius thereof.

7. In a mandrel, the combination with a substantially torus-shaped body subtending nearly but not quite a complete circle and having inclined ends spaced apart to provide a gap, of a single removable section adapted to fit into said gap and complete the contour of said mandrel, the engaging ends of said body and section being formed with interfitting tongues and grooves which are parallel to the plane of the torus.

8. In a mandrel, the combination with a substantially torus-shaped body subtending nearly but not quite a complete circle and having inclined ends spaced apart to provide a gap, of a single removable section adapted to fit into said gap and complete the contour of said mandrel, the engaging ends of said body and section being formed with interfitting tongues and grooves which are parallel to the plane of the torus, and one of the parts being provided with one or more longitudinally protrudable latches and the other of the parts to hold the same in fixed position relatively with sockets for the reception of said latches.

9. A mandrel for the purpose described comprising a hollow, substantially torus shaped body subtending upwards of three quarters of a circle and less than a complete circle and having hermetically closed ends, the body of said mandrel being formed with a plurality of air escape apertures, and also adjacent to one of its ends with an air admission aperture.

10. A two piece torus shaped mandrel, the pieces being of unequal angular extent, the shorter piece being provided with one or more longitudinally protrudable latches, and the longer piece having air tight ends formed with sockets adapted to receive said latches, the wall of said larger piece being formed with a plurality of air escape apertures, and said larger piece also having an air admission aperture.

11. A two piece torus shaped mandrel, the pieces being of unequal angular extent, the shorter piece fitting between the ends of the larger piece and the longer piece being hollow and having air tight ends formed to engage and hold in position said shorter piece, the wall of said larger piece being formed with a plurality of air escape apertures, and said larger piece also having an air admission aperture.

In testimony whereof, I hereunto affix my signature.

HARVEY F. MARANVILLE.